Nov. 11, 1969  R. J. WARNEKE  3,477,146
TEACHING DEVICE
Filed Jan. 26, 1967  3 Sheets-Sheet 1
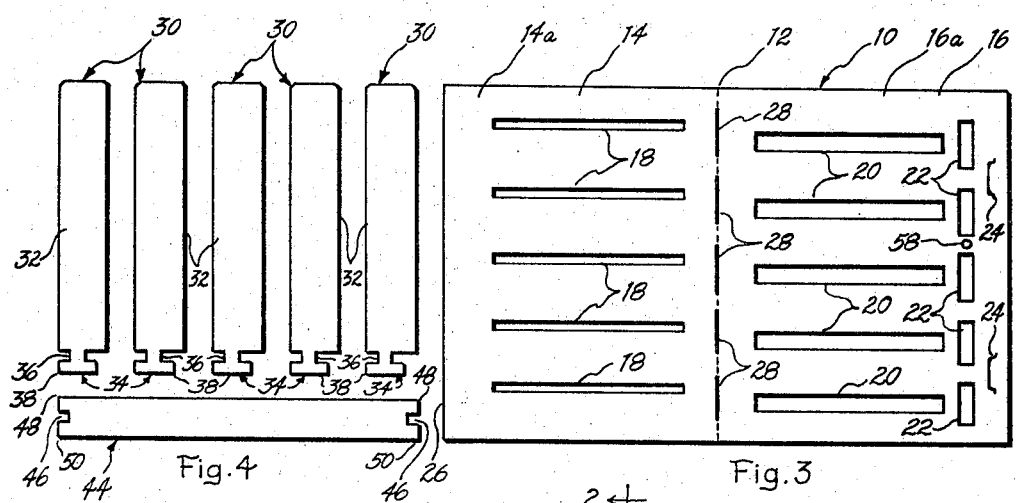
INVENTOR.
RICHARD J. WARNEKE
BY

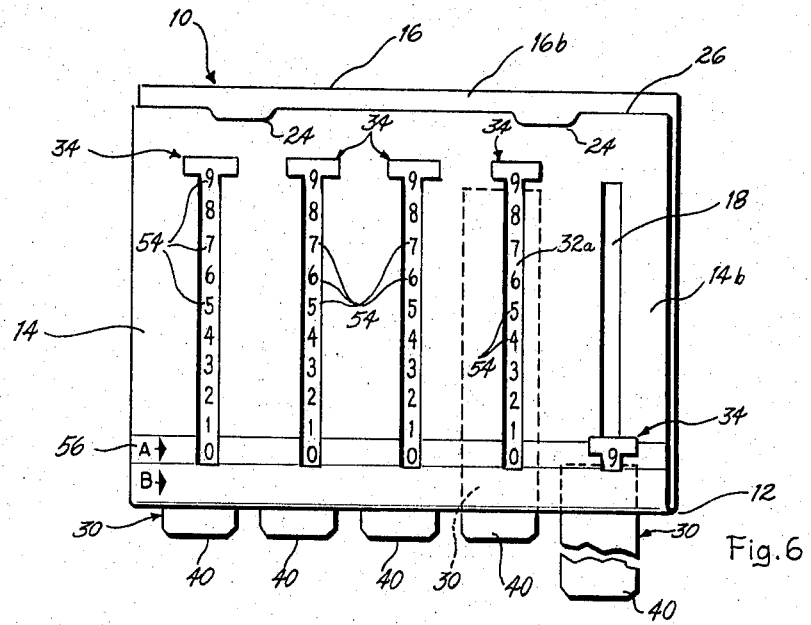
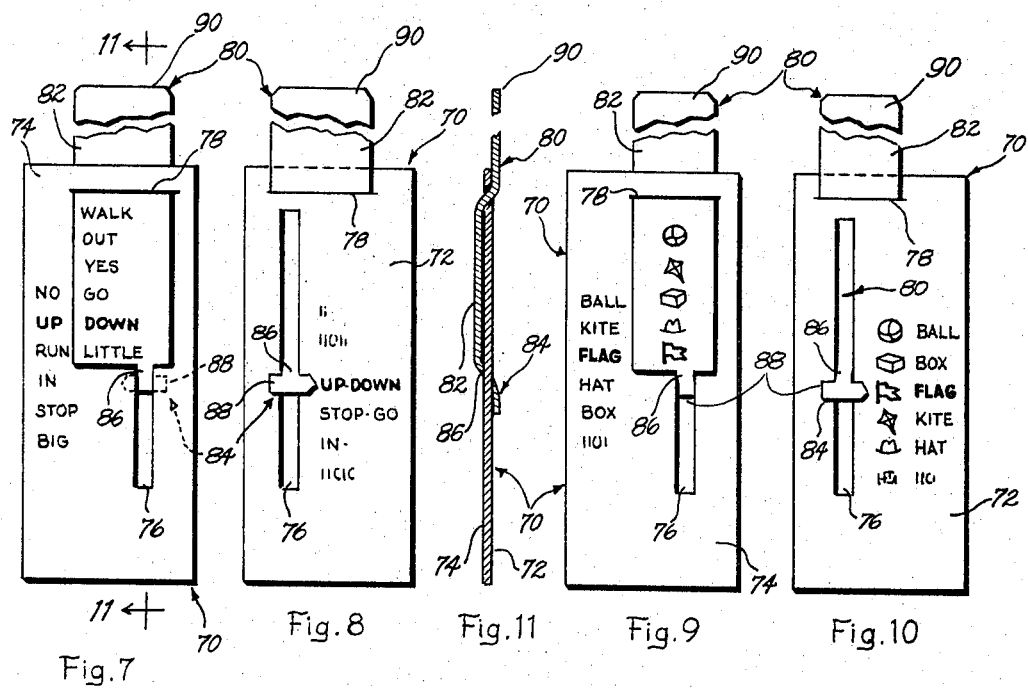

Nov. 11, 1969    R. J. WARNEKE    3,477,146
TEACHING DEVICE
Filed Jan. 26, 1967    3 Sheets-Sheet 3
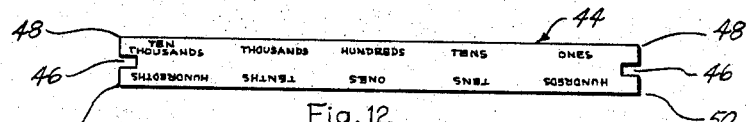
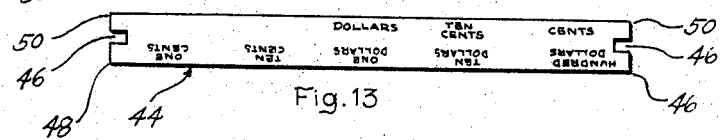
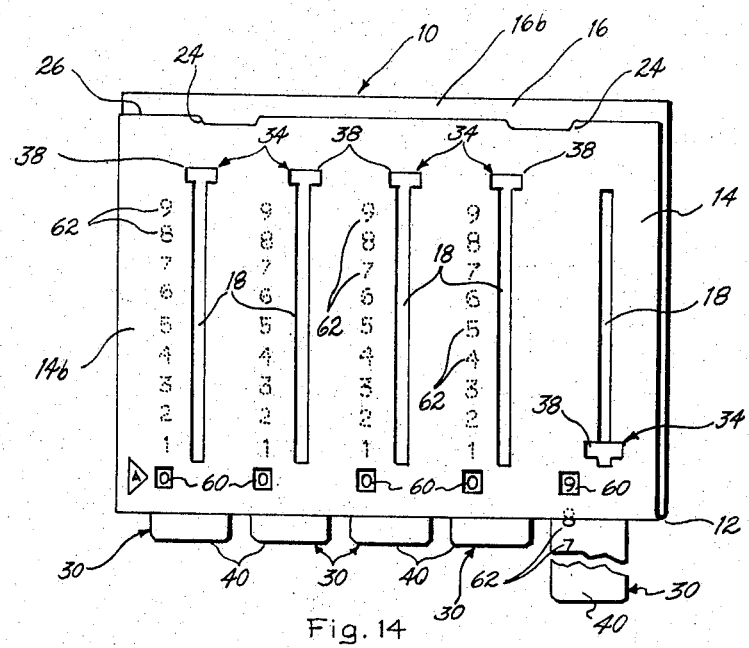
INVENTOR.
RICHARD J. WARNEKE
BY

United States Patent Office 3,477,146
Patented Nov. 11, 1969

3,477,146
TEACHING DEVICE
Richard J. Warneke, 3824 Grand Ave.,
Western Springs, Ill. 60558
Filed Jan. 26, 1967, Ser. No. 611,960
Int. Cl. G09b 1/16; G09f 11/30
U.S. Cl. 35—75                                    11 Claims

ABSTRACT OF THE DISCLOSURE

A teaching device comprising a sheet having one or more slots formed therein, and movable members or slides, corresponding in number to the number of slots in the sheet, in engagement with the slots. The sheet and the movable members are provided with a learning program format comprising increments of information which can be correlated by movement of said members relative to the slots.

Background of the invention

Programmed learning devices for independent learning have, for many years, been recognized as important educational tools. Devices of this type have taken various forms ranging from simple cards to complex electronic machines. Generally speaking, teaching devices, whether they be of simple or complex construction, heretofore have been limited, from a structural standpoint, to use in connection with subject matter which is adaptable only to a particular learning program format. This lack of versatility in prior devices of the type here under consideration, together with the comparatively high cost of such devices, both at the manufacturing and retail levels, has made them unattractive to educators and, as a consequence, has limited student exposure to these valuable teaching aids.

In accordance with the present invention there is provided a teaching device which, while being both inexpensive and simple to operate, is constructed in a manner to make it adaptable for use in connection with a wide variety of subjects. The increments of information or other schema or data comprising any given learning program format employed with the device can be arranged thereon to give only a single correct answer reinforcement. The device is self-contained, light in weight, and can withstand rough handling. The separable components of the device are interlocked in a unique manner thereby eliminating the need for auxiliary fastening or connecting means. This unique interlocking feature of the components of the device facilitates and simplifies manufacture and packaging of the device, and enables the device to be assembled at its point of use.

Briefly, the teaching device of the present invention comprises a sheet desirably having a plurality of spaced, substantially parallel slots formed within the margins thereof. The sheet advantageously is provided with a plurality of slits, spaced from and transverse to, the slots formed in the sheet. Each of the slits is adapted to receive a slide having a tab or slot-engaging extension joined to an end thereof. The tabs or extensions on the slides, in part, are wider than the slots formed in the sheet, and are adapted to be inserted through, and locked in, the slot whereby the wide portion thereof is positioned on a side of the sheet opposite to that on which the main body portion of the slide is positioned. The tabs or extensions serve to prevent the slides from being inadvertently completely withdrawn from the device, and, in cooperation with the transverse slits in the sheet, act to keep printed matter, or other indicia, on one or both faces of the slides properly aligned with relation to the slots in the sheet.

In the preferred embodiment of the invention the device is formed from a sheet which is foldable upon itself, and each leaf of the sheet is provided with a plurality of spaced, substantially parallel slots. Slides, having tabs or extensions as described above, are locked in the slots formed in one leaf of the sheet. The non-slide carrying slots in the other leaf, while being substantially parallel to the slots in said one leaf, desirably are off-set therefrom when the sheet is in its normally folded position thereby enabling an area of the rear face of said one leaf, opposite the non-slide carrying slots, to be seen when the slides are moved longitudinally in their associated slots. The slides are of sufficient length to enable an end portion thereof to be grasped by the fingers of a user and thus be moved longitudinally with relation to their associated slots in the folded sheet. Windows or cut-outs are provided adjacent the ends of the slots in the folded sheet enabling printed material, for example, on the sheets or slides to be seen therethrough. The device further advantageously is provided with an insert which desirably is carried by said other leaf of the folded sheet at the windows or cut-outs provided therein. Locking means are formed in the sheet for maintaining the folded leaves thereof in superimposed relation to one another.

Increments of information, schema or data, both in complete and incomplete form, comprising a learning program format are arranged on the slides and the faces of the sheet, as well as on the insert. The incomplete increments or other schema can be correlated by movement of the slides along their associated slots. A correct correlation will result in a reinforcement of the user's assimilation of the subject matter and this reinforcement will be imparted to the user by the device. The subject matter of the format can be selected to accommodate the needs of students at all grade levels. The device requires no special mechanical skills to operate. It provides a unique, efficient and interesting vehicle for aiding a teacher effectively to convey basic concepts, relationships, and the like, to students with minimum effort.

The above and other objects, advantages and features of the invention will become apparent upon making reference to the specification to follow, the claims, and the drawings wherein:

Brief description of the drawing

FIG. 1 is a plan view of an embodiment of the teaching device of the present invention;

FIG. 2 is a sectional view taken substantially along line 2—2 of FIG. 1;

FIG. 3 is a plan view of the foldable sheet portion of said embodiment;

FIG. 4 is a plan view of the slides and the insert which comprise separable and movable portions of said embodiment;

FIG. 5 is a view in perspective of said embodiment showing the manner in which the slides are engaged with the foldable sheet portion thereof;

FIG. 6 is a plan view corresponding to that of FIG. 1 showing the reverse side of said embodiment;

FIGS. 7–10 are front and reverse side plan views of other embodiments of the device of the present invention;

FIG. 11 is a sectional view taken substantially along line 11—11 of FIG. 7;

FIGS. 12 and 13 are plan views of each side of an embodiment of an insert for use with the device showing various place value determinations; and FIG. 14 is a plan corresponding to the view of FIG. 6 showing another embodiment of the teaching device of this invention.

Referring, now, in greater detail to the drawings, the embodiment of the invention illustrated in FIGS. 1 through 6, comprises a substantially rectangular body portion 10 desirably fabricated of a semi-rigid or rigid material such as cardboard, paperboard, plastic, or the like. The body portion 10 is folded upon itself along a crease or fold line 12 to provide a slide-holding portion 14 and an insert-holding portion 16. The slide-holding portion 14 has an inner face 14a and an outer face 14b, and is provided with a plurality of spaced, substantially parallel, slide-engaging slots 18 formed therein. The insert-holding portion 16, in turn, has an inner face 16a and an outer face 16b, and is provided with a plurality of spaced, substantially parallel viewing slots 20 advantageously corresponding in number to the number of slide-engaging slots 18 in the slide-holding portion 14. The insert-holding portion 16, in addition, has a plurality of spaced windows or cut-outs 22 formed therein, each of which is positioned adjacent to one end of the viewing slots 20. The insert-holding portion 16 further desirably has locking tabs 24—24 formed therein for engaging the free edge 26 of the slide-holding portion 14. To this end, the insert-holding portion 16 advantageously is somewhat longer than the portion 14 to enable the free edge 26 of the portion 14 to be engaged by the locking tabs 24—24. Between the portions 14 and 16, along the crease or fold line 12, there is provided a plurality of spaced, slide-receiving slits 28. The slits 28 correspond in number to the number of slide-engaging slots 18, and each slit is positioned adjacent and transverse to one end of each of the slots 18.

The device, as illustrated, is provided with a plurality of elongated, relatively narrow slides 30 desirably fabricated of the same material as the body portion 10 of the device. The slides 30 correspond in number to the number of slide-engaging slots 18 in the portion 14 and each comprises an elongated portion 32, having an inner face 32a and an outer face 32b, and a slot-engaging tab or extension 34, joined to one end of the elongated portion 32. The tab or extension 34 of the slides, as shown, is generally T-shaped and comprises a neck portion 36, joined at one end to the elongated portion 32 of the slides, and a cross or transverse portion 38 joined to the other end of the neck portion 36.

As shown in FIG. 5, the slides 30 are secured on the sheet 10 by inserting the tab or extension 34 of the slides through the slots 18 while holding the elongated portion 32 of the slides in a plane substantially transverse to the horizontal plane of the portion 14 of the sheet 10. The elongated portion 32, together with the tab or extension 34 of the slides, are then rotated through an approximately 90° angle and the opposite end of each elongated portion 32 is inserted through a transverse slit 28 in the sheet 10. Thusly secured, the greater proportion of the inner face 32a of the elongated portion 32 of the slides overlies the inner face 14a of the portion 14 of the sheet, while the cross or transverse portion 38 of the tab or extension 34 overlies the outer face 14b of the portion 14 adjacent the slots 18 therethrough. The width of the neck portion 36 or the tab or extension 34 of the slides 30 is slightly less than the width of its associated slot 18. The width of the cross or transverse portion 38 of the tab or extension 34 of the slides, on the other hand, is substantially greater than that of its associated slot 18. This arrangement, while enabling a slide to be moved longitudinally with relation to the slot 18, prevents the slide from being completely disengaged from the device during operation. Thus, when the slide is pulled in a direction to bring the cross or transverse portion 38 of the tab or extension 34 into engagement with the end of the slot 18 nearest the slit 28, the edge of the cross or transverse portion 38 adjacent each side of the neck portion 36 of the tab or extension 34 provides a shoulder which engages the end of the slot 18. When the slide 30 is moved in the opposite direction, to bring the cross or transverse portion 38 into engagement with the end of the slot 18 nearest the free edge 26 of the portion 14, the edge of the elongated portion 32 of the slide 30 adjacent each side of the neck portion 36 of the tab or extension 34 provides a shoulder for engaging the said end of the slot 18. To enable the slides to be moved with facility in their respective slots, the elongated portion 32 thereof advantageously is of a length to provide a gripping portion 40 which protrudes outwardly from the slits 28 when the slide is in its fully retracted position and the portions 14 and 16 are interlocked (see FIG. 1).

The portion 16 of the sheet 10 carries an elongated insert 44, the purpose of which will become clear as the description proceeds. Each end of the insert 44 is provided with a substantially centrally positioned notch or cut-out 46. The notches or cut-outs form cooperating pairs of window-engaging extensions 48—48 and 50—50 in the insert 44. The cooperating window-engaging extensions of the insert are adapted to be engaged in the end or outermost windows or cut-outs 22 formed in the portion 16 (see FIGS. 1 and 5). As shown, the cooperating pair of extension 48—48, for example, overlie a portion of the outer face 16b of the portion 16, adjacent the outer edge of the end windows, when the insert is in one position on the portion 16. The other pair of cooperating extensions 50—50, in this portion of the insert, overlie a portion of the inner face 16a of the portion 16. The insert 44 desirably has a length such that it must be flexed slightly in order to engage a cooperating pair of the extensions 48—48 or 50—50 in the end windows. By thus placing the insert under slight stress, the innermost edge of the notch 46 in the ends of the insert will be urged against the outermost edge of each of the end windows thereby preventing easy dislodgment of a cooperating pair of extensions from the windows in the portion 16.

In the embodiment of the invention illustrated in FIGS. 1–6, the device is provide with a learing program format intended to teach a student at the lower grade levels place values or the base-ten system. To this end, the device combines the features of an abacus and place value indicia. Thus, on the inner surface 14a of the portion 14, nine markings 52, in the form of dots or circles, or the like, are placed, in spaced relation, along the length of each of the slide-engaging slots 18. This arrangement constitutes the abacus portion of the device. The side 32a of the slides 30, facing the inner face 14a of the portion 14, in turn, is provided with a column of numbers 54 ranging from 0 to 9, the numbers 1 through 9 of each column being spaced in a manner such that the number in any column appearing along an answer row 56, designated by the letter "A," as shown in FIG. 6, will correspond to the number of markings exposed to view by movement of the slides in the direction of the answer row A. Row B provides an area for recording a problem prior to solving the same problem. After working the problem on the opposite side the user compares his answer in row A to his written problem in row B. The number of markings 52 may be varied, as desired, and the numerals 54 appearing on the slides, of course, may be varied to correspond to the number of markings. Thus, for example, nineteen markings may be provided on the inner face 14a of the portion 14 alongside each of the slots 18 and numerals ranging from 0 to 19 may be placed on the inner face 32a of each slide.

In utilizing the device illustrated in FIGS. 1–6, a student is provided with the opportunity of being numerically reinforced with respect to groups or sets of markings on one side of the device. In FIG. 1, for example, nine markings in the righthand column have been exposed by movement of the slide. The markings are visible through the slots 20 in the portion 16 of the sheet 10. Upon turning the device over, a student will see the number nine in the corresponding column opposite the letter A in the answer row 56, and thereby experience a numerical reinforcement with respect to the number of markings comprising the group, or set, on the side of the device first viewed by him.

The right hand column of markings on the inner face 14a of the portion 14 of the sheet constitutes the "ones" column of the abacus. The student is made aware of the fact that when he has exposed all nine markings in the "ones" column, he must utilize the second column from the right, or the "tens" column, to be reinforced by a numerical representation or designation with respect to a group, or set, of markings greater than nine. The third column from the right comprises the "hundreds" column, while the next column constitutes the "thousands" column. The far left column is the "ten thousands" column. Thus, as the student exposes all of the nine markings in each column, he will receive a progressively higher numerical reinforcement on the opposite side of the device. As will be pointed out hereinafter, the insert 44 can be provided with printed indicia to indicate the various place value determinations noted.

The insert 44 enables full advantage to be taken of the group or set-number relationships on the device. As shown in FIGS. 12 and 13, each side of the insert is provided with different indicia, schema or data arranged in rows substantially at the level of the cooperating pairs of extensions 48—48 and 50—50 thereof. In the embodiment of the insert 44 illustrated, various place value relationships are set out, including dollars and cents determinations. The indica or printed matter on the insert will be visible throught the windows or cut-outs 22 in the portion 16. Decimal points desirably are provided where appropriate, on the faces of the insert between the second and third place value designations, as viewed from the right in FIGS. 12 and 13. An opening or hole 58 desirably is provided in the portion 16 to enable the decimal points to be seen by the user.

In the embodiment of the invention illustrated in FIG. 14, the device there shown is like the embodiment described above except that the slide-holding portion of the sheet 10 has a plurality of relatively small, square-shaped windows 60 formed therein, and the column of numbers 62 on each of the slides 30 is offset with respect to the slots 18 in the portion 14. The windows 60 correspond to the answer row A of the embodiment shown in FIG. 6, and, as in that embodiment, the letter A is used to designate the row of windows 60. The arrangement of windows 60 and offset numbers 62 in this embodiment of the invention enables a student to be reinforced by a single numerical representation or designation with relation to groups or sets of markings exposed by movement of each of the slides. In other words, the student views only one number through each of the windows 60 thereby eliminating any possible distraction of his attention by the remaining numbers comprising the columns 62. Thus, as shown in FIG. 14, when the right hand slide 30 has been moved to the position indicated, nine markings on the inner face 14a of the portion 14 will be visible through the right hand slot 20 in the portion 16, and only the numeral 9 will appear in the right hand window 60.

In FIGS. 7 through 11, the device is shown as comprising a single sheet 70 having a front face 72 and a rear face 74. The sheet 70 is formed with a narrow, longitudinally extending slot 76 therethrough, and a transverse slit 78 adajacent one end of the slot 76. A slide 80 comprising an elongated portion 82 having joined to one end thereof a slot engaging tab or extension 84 is provided for the sheet 70. The tab or extension 84 has a neck portion 86 and a cross or transverse portion 88. The slide 80 is secured on the sheet 70 in the same manner as the slides 30 are secured on the sheet 10 of the embodiment of the device described above. Thus, in its operative positon, the cross or transverse portion 88 of the tab or extension 84 will overlie the front face 72 of the sheet while the elongated portion 82 of the slides, in its fully retracted position, will overlie the rear face 74 of the sheet opposite the slot 76 therethrough. The slide 80 desirably is of sufficient length to provide a gripping portion 90 at the non-tab or extension carrying end thereof.

The front face 72 of the sheet 70 is provided with complete increments of information, schema or data, arranged in columnar form thereon. The trear face 74 of the sheet 70 has incomplete increments of information, schema or data, corresponding to a portion only of the complete increments on the front face 72, arranged in columnar form thereon. The exposed face of the elongated portion 82 of the slide 80, overlying a portion of the rear face 74 of the sheet 70, will elicit a correct answer reinforcement on the front face 72 alongside the cross or transverse portion 88 of the tab or extension 84. The increments of the learning program format are arranged on the sheet 70 and the slide 80 to insure that only one correct answer reinforcement is possible on the front face of the sheet. The incomplete increments of information, schema or data appearing on the rear face 74 of the sheet and on the slide 80 advantageously are scrambled to prevent any possible associations by a student with respect to the order of arrangement of the learning program format.

In FIGS. 7 and 8, the adaptability of the device to teaching word opposites or antonyms is shown. The complete increments, for example, the words "up-down" and "stop-go" are arranged in columnar form on the front face 72. One portion, or an incomplete increment of each of the complete increments, for example, the words "up" and "stop" are arranged on the rear face 74 of the sheet 70. The other portion of each complete increment, for example, the words "down" and "go" are arranged on the rear face 74 and the slide 80 to prevent the student from experiencing more than one correct answer reinforcement on the front face 72.

In utilizing the device, the student first studies the word relationships on the front face 72. When he believes he has learned the relationships, he turns the device over and tests himself with respect to each of the word groupings by moving the slide 80 in a direction to correlate the words on the slide with the words on the rear face 74 of the device. As shown in FIGS. 7 and 8, when the student has correctly correlated the word "down" on the slide with the word "up" on the rear face 74, upon turning the device over, he will experience a correct answer reinforcement as indicated by the cross or transverse portion 88 of the tab or extension 84 which will be positioned alongside the complete increment, i.e., the words "up-down," on the front face 72 of the sheet 70. As stated, only one correct answer reinforcement is possible.

In FIGS. 9 and 10, the adaptability of the device to teaching word-picture groupings is illustrated. As with the embodiment shown in FIGS. 7 and 8, complete increments of information, i.e., a picture and a word describing it, are arranged in side-by-side relation in a column on the front face 72. The pictures, only, are randomly arranged on the slide, while the words, only, are randomly arranged on the rear face 74 of the sheet 70. In utilizing this form of the device, the student, as before, will study the picture-word groupings on the front face 72. When he has completed the learning process, he will turn the device over and go through the aforedescribed self-testing procedure. Only one correct answer reinforcement will be possible for any given word-picture grouping.

The dimensions of the device illustrated in FIGS. 7–11, and, correlatively, the number of slots and slides employed, can, of course, be varied as desired. Similarly, the nature of the subject matter upon which the learning program format is based, in all of the embodiments of the invention described, is variable. In this connection, the device can be used to teach arithmetical and mathematical relationships, as well as problem solving in these areas. The device, furthermore, is adaptable to teaching basic concepts in the fields of chemistry, physics and biology. Thus, while the invention has been described with relation to illustrated specific embodiments thereof, it should be understood that the invention is not to be

What is claimed is:

1. A device having utility as a teaching aid comprising a sheet of material having at least one relatively narrow, elongated slot formed therethrough, a movable slide adapted to be carried by said sheet and having a width appreciably greater than the width of the slot and a slot-engaging extension joined to the slide, said extension comprising a narrow neck portion and a relatively wide transverse portion, said neck portion being laterally offset with respect to the longitudinal axis of the slide and having a width corresponding substantially to the width of the slot and being joined at one of its ends to the slide and at its other end to said relatively wide transverse portion, said transverse portion being insertable through the slot and positionable on the side of the sheet opposite to that on which said visible area of the slide is positioned and being movable by the slide along the slot in a plane which substantially overlies the horizontal plane of the slot, said sheet, at least, having increments of information arranged thereon adjacent the slot which normally are screened from view by an area of the slide and which comprise the elements of a learning program format, said increments being exposable and correlatable by movement of the slide along the slot to enable the user to experience learning reinforcement with respect to the increments of the programmed format.

2. A device according to claim 1 wherein the sheet is provided with a slit positioned adjacent an end of the slot in the sheet for receiving the slide, said slit cooperating with the slot-engaging extension to maintain the said visible area of the slide properly aligned with respect to the slot in the sheet.

3. A device according to claim 1 wherein the slide has increments of information arranged thereon and the sheet is provided with an answer window positioned adjacent the slot, said window being of a size to permit only a limited number of the increments of information arranged on the slide to be successively viewed therethrough.

4. A device according to claim 1 wherein the sheet is foldable upon itself to provide a slide carrying portion and an insert carrying portion, said slide carrying portion having a plurality of slots formed therein, each of the slots having a movable slide and slot-engaging extension as described associated therewith.

5. A device according to claim 4 wherein one of the portions has releasable locking extensions formed therein for engaging an edge of the other portion thereby to maintain the portions in a folded condition.

6. A device as claimed in claim 4 wherein the foldable sheet has a plurality of slide-receiving slits formed therein along the fold line of said portions for guiding the slides.

7. A device according to claim 4 wherein the insert carrying portion of the sheet is provided with a plurality of slots therethrough corresponding in number to the number of slots in the slide carrying portion thereby to enable an area of the slide carrying portion opposite the slots in the insert carrying portion to be seen.

8. A device according to claim 7 wherein the insert carrying portion of the sheet has a plurality of windows formed therein, each window being positioned adjacent a slot in the insert carrying portion and exposing to view different areas of the slide carrying portion opposite thereto.

9. A device according to claim 7 wherein the insert carrying portion has a detachable insert secured thereon, said insert having indicia, schema, or data thereon which comprise a part of the learning program format of the device.

10. A device according to claim 9 wherein the insert is provided with cooperating pairs of locking extensions at the ends thereof for attaching the insert on the insert carrying portion of the sheet.

11. A device as claimed in claim 7 wherein the area of the slide carrying portion visible through the slots in the insert carrying portion has arranged thereon increments of information comprising a part of a learning program format and the area of the slides visible through the slots in the slide carrying portion has arranged thereon other increments of information comprising a part of the learning program format, movement of the slides of the device enabling said increments to be correlated whereby a user of the device will be reinforced with respect to the various components of the learning program format of the device.

References Cited

UNITED STATES PATENTS

| | | | |
|---|---|---|---|
| 97,960 | 12/1869 | Poulson et al. | 40—65 |
| 1,249,980 | 12/1917 | Mahan | 40—65 |
| 1,514,517 | 11/1924 | Hamilton | 40—63 |
| 1,525,696 | 2/1925 | Spencer | 35—75 |
| 1,749,619 | 3/1930 | Widoe | 40—65 |
| 1,941,733 | 1/1934 | Badanes | 35—75 |
| 2,848,824 | 8/1958 | Donaldson | 35—75 |
| 2,894,337 | 7/1959 | Rawlings | 35—75 |

EUGENE R. CAPOZIO, Primary Examiner

HARLAND S. SNOGQUIST, Assistant Examiner

U.S. Cl. X.R.

40—65